United States Patent [19]
Daniel et al.

[11] Patent Number: 5,724,659
[45] Date of Patent: Mar. 3, 1998

[54] MULTI-MODE VARIABLE BANDWIDTH REPEATER SWITCH AND METHOD THEREFOR

[75] Inventors: Brian Michael Daniel, Phoenix; Rodrigo Ibanez-Meier, Chandler; Sibnath Basuthakur, Phoenix, all of Ariz.

[73] Assignee: Motorola, Inc., Schaumburg, Ill.

[21] Appl. No.: 673,584

[22] Filed: Jul. 1, 1996

[51] Int. Cl.$^6$ ...................................................... H04Q 7/00
[52] U.S. Cl. ................................................ 455/452; 455/454
[58] Field of Search .................................... 455/422, 432, 455/433, 434, 435, 450, 451, 452, 453, 454, 455, 507, 509, 510, 517, 524, 525; 370/259; 379/67

[56] References Cited

U.S. PATENT DOCUMENTS

| | | |
|---|---|---|
| 4,612,415 | 9/1986 | Zdunek et al. ............................ 455/454 |
| 5,025,254 | 6/1991 | Hess ........................................ 455/509 |
| 5,481,534 | 1/1996 | Beachy et al. ........................... 370/259 |
| 5,544,229 | 8/1996 | Creswell et al. ........................... 379/67 |

*Primary Examiner*—Amelia Au
*Attorney, Agent, or Firm*—Walter W. Nielsen

[57] ABSTRACT

An enhanced services communication system (10) has a standard services region and an enhanced services region (58) in which communication may be carried out. Subscriber units (49, 109) located within the enhanced services region (58) request enhanced services that include dynamic allocation of bandwidth. A variable bandwidth repeater switch (42) evaluates the availability of requested bandwidth and allocates the bandwidth to the subscriber units (49, 109) when available. Transmission of data using enhanced services occurs using wideband wired interfaces (115), wideband wireless interfaces (70), or PSTN interfaces (103). Selection of dynamic allocation of bandwidth may rely upon economic, propagation duration, or link quality factors, among other considerations.

21 Claims, 4 Drawing Sheets

MULTI-MODE VARIABLE BANDWIDTH REPEATER SWITCH AND METHOD THEREFOR

FIELD OF THE INVENTION

This invention relates generally to the field of wireless communication and, more specifically, to methods and systems that provide variable bandwidths to users.

BACKGROUND OF THE INVENTION

Communication systems generally are designed to facilitate transmission of a defined or predictable type such as voice, data, or video and transmit such data using a predefined and designed bandwidth. Such rigid bandwidth designs are sufficient for providing basic services to subscriber units designed to transmit only limited forms of data at constant bandwidths, however, for subscriber units that employ multiple forms of media requiring diverse data rates, or for communication that may occasionally involve the transfer of substantial amounts of information, rigid and fixed bandwidths for data transfers limit the performance of such communication systems.

Independent communication systems have evolved to handle specific forms of diverse media such as cellular communication systems for handling voice communication, local and wide area networks for distributing computer data, and wide bandwidth satellite and fiber optic systems for transceiving video and other high data rate information. Transmission of information not specifically or ideally tailored for a specific system incurs needless expense or protracted transmission of non-ideal information. For example, transmitting video imagery over a low data-rate cellular or telephone system requires substantial time and inserts considerable delay into the transmission path between images. Furthermore, substantial expense may be incurred for additional connect time to these services. Conversely, transmission of low data-rate information such as a voice conversation over a high bandwidth satellite communication link or fiber optic link may be expensive for the amount of data actually transferred.

Thus, what is needed is a system and method for detecting the availability of enhanced communication services, and dynamically allocating bandwidth to a subscriber unit as needed for improving efficiency of transfer of information.

BRIEF DESCRIPTION OF THE DRAWINGS

The invention is pointed out with particularity in the appended claims. However, a more complete understanding of the present invention may be derived by referring to the detailed description and claims when considered in connection with the figures:

Figure 1:
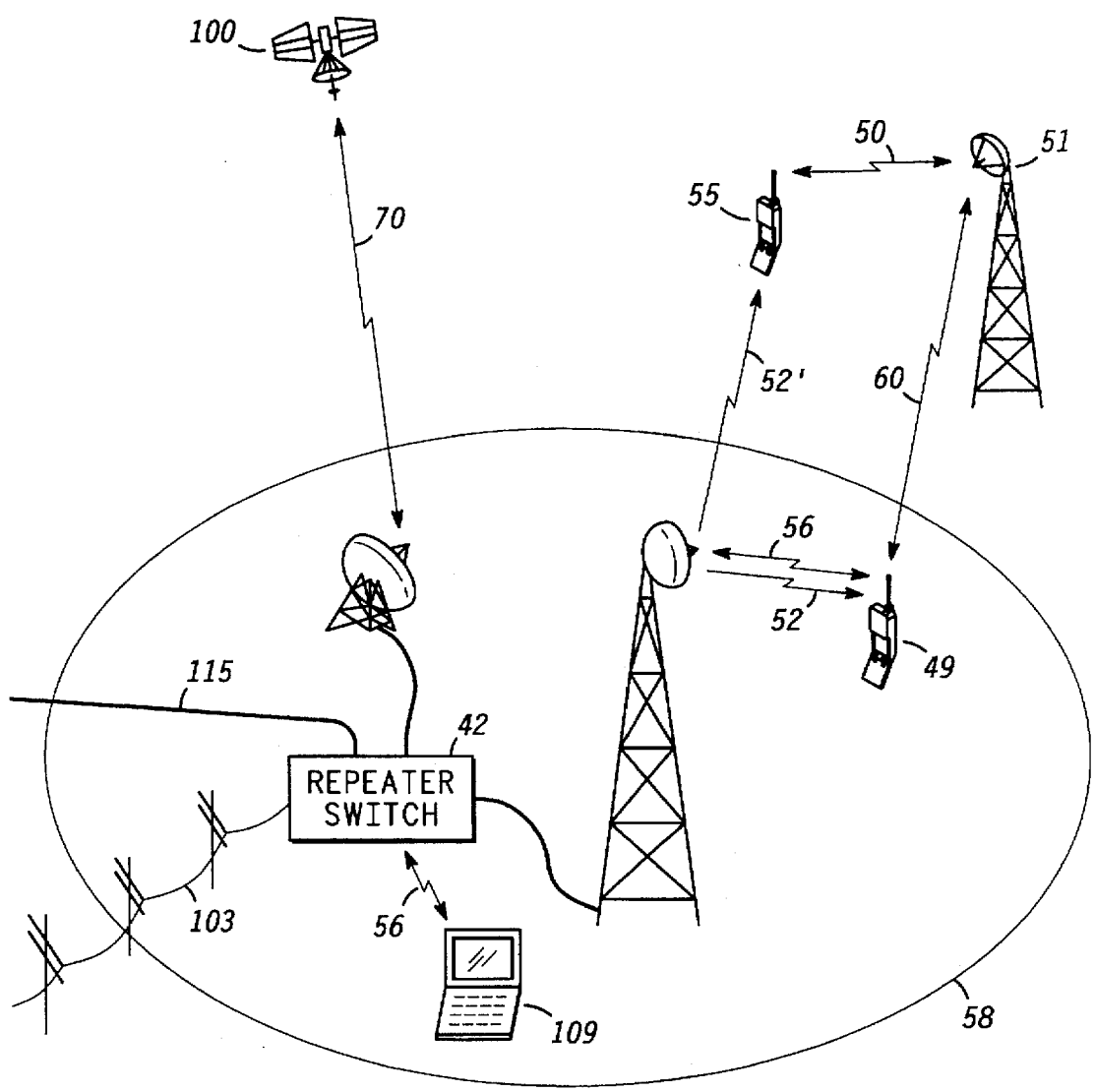
FIG. 1 illustrates a communication system having an enhanced services region, in accordance with a preferred embodiment of the present invention.

The exemplification set out herein illustrates a preferred embodiment of the invention in one form thereof, and such exemplification is not intended to be construed as limiting in any manner.

DETAILED DESCRIPTION OF THE DRAWING

The present invention provides, among other things, a method and system for dynamically allocating bandwidth through a variable bandwidth repeater switch to a subscriber unit located in an enhanced services region. The method and system include detecting the availability of enhanced services, evaluating the availability of requested bandwidth, and allocating the requested bandwidth to the subscriber unit.

The present invention further provides a method for a subscriber unit to employ enhanced services by allocating bandwidth in a variable bandwidth repeater switch. The switch has a plurality of interconnections and can detect the availability of enhanced services, request enhanced services, and employ the requested services when granted.

FIG. 1 illustrates a communication system having an enhanced services region, in accordance with a preferred embodiment of the present invention.

In enhanced communication system 10, a subscriber unit 55 employs standard communication techniques over standard communication link 50 with a standard services communication system 51. Standard services communication system 51 is a typical cellular communication system or other two-way wireless or wired communication system. A subscriber unit 49 or 109 also communicates with standard services communication system 51 over standard communication link 60. Subscriber unit 49 may be a cellular phone-type communication transceiver while subscriber unit 109 may be a data terminal such as a computer device.

Enhanced communication system 10 provides enhanced services to users therein by dynamically allocating bandwidth to subscriber units resident in an enhanced services region 58. In a preferred embodiment, enhanced services region 58 is formed by transmission of an enhanced services beacon signal 52. All subscriber units capable of receiving enhanced services beacon signal 52 may request enhanced services from enhanced services communication system 10. Enhanced services beacon signal 52' propagates outside of enhanced services region 58 to subscriber unit 55, but the received signal level is degraded such that an enhanced services communication link with subscriber unit 55 is not practical.

Subscriber units 49 and 109, when located within enhanced services region 58, may request enhanced services. Enhanced services may include dynamically allocating bandwidth for transceiving data. Dynamic allocation includes increasing the data transfer rate or bandwidth over enhanced services communication link 56, or decreasing the data transfer rate by interconnecting to a more economical lower data-rate bandwidth service sufficient for the needs of the user of subscriber units 49 and 109.

Enhanced services requests are evaluated by a variable bandwidth repeater switch 42 by determining if communication resources are available to accommodate the requested bandwidth. If resources are available, variable bandwidth repeater switch 42 dynamically allocates the requested bandwidth to the requesting subscriber unit Variable bandwidth repeater switch 42 has a variety or plurality of alternative resources or interconnections through which to route or interconnect subscriber unit 49 and 109 with another node or user. Interconnections include a PSTN interface 103, a wideband wired interface 115 (e.g., fiber optic link, or shielded cable interface), and a wideband wireless interface 70 such as a microwave communication link or laser link with another high frequency transceiver such as a satellite 100 or microwave repeater. Bandwidth may also be accommodated by employing multiple channels of a lower bandwidth medium or other techniques known by those of skill in the art.

Figure 2:
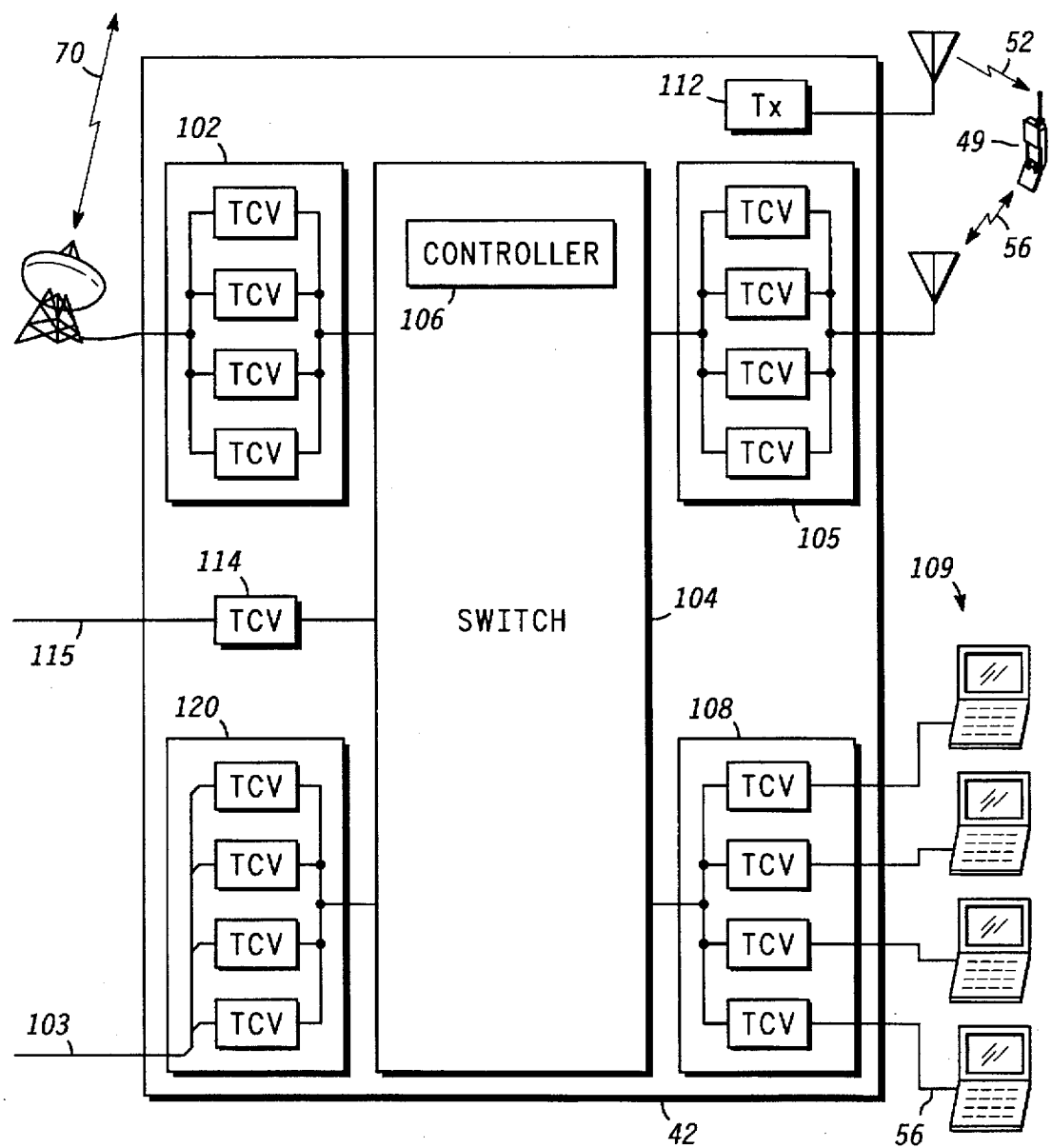
FIG. 2 illustrates a simplified block diagram of a variable bandwidth repeater switch for use in a communication system, in accordance with a preferred embodiment of the present invention.

FIG. 2 illustrates a simplified block diagram of a variable bandwidth repeater switch for use in a communication system, in accordance with a preferred embodiment of the present invention.

Variable bandwidth repeater switch 42 dynamically allocates bandwidth when requested to subscriber units 49 and 109. Wireless subscriber unit 49 or wired subscriber unit 109 detects the availability of enhanced services. Wireless subscriber unit 49 may detect the presence or availability of enhanced services by monitoring for the presence of enhanced services beacon signal 52 as transmitted by an enhanced services beacon transmitter 112. In the preferred embodiment, enhanced services beacon transmitter 112 defines enhanced services region 58 (FIG. 1) by broadcasting enhanced services beacon signal 52 throughout enhanced services region 58 (FIG. 1). In another preferred embodiment, wireless subscriber unit 49 detects the presence or availability of enhanced services by coding in a communication link with a variable bandwidth repeater switch status or other indicator informing wireless subscriber unit 49 of such services.

An enhanced services communication link 56 carries a request for enhanced services which may be a bandwidth request message to variable bandwidth repeater switch 42. Enhanced services communication links 56 with wireless subscriber unit 49 and wired subscriber units 109 are serviced by wireless enhanced services region transceivers 105 and wired enhanced services region transceivers 108, respectively. Enhanced services region transceivers 105 and 108 receive a bandwidth request from subscriber units 49 and 109, respectively, and when approved or authorized for enhanced services, employ the requested bandwidth by transmitting and receiving consistent with the requested bandwidth.

A switch controller 106 performs an authorization or validation of requesting subscriber units to verify authorization of subscriber units to perform enhanced services. Switch controller 106 also processes an enhanced services request and, when resources are available to dynamically allocate the requested bandwidth, switch controller 106 controls the interconnections of switch 104 to form the appropriate interconnections with the transmission services.

Enhanced services transmission transceivers 102, 114, and 120 establish an interface with transmission services and employ the requested bandwidth by transmitting and receiving consistent with the requested bandwidth. For example, a wired enhanced service transmission transceiver 120 provides the appropriate interface with PSTN interface 103 for accommodating enhanced services. Also, a wideband wired enhanced services transmission transceiver 114 provides an appropriate interface for a wideband wired interface 115. Wideband wired interface 115 may be a fiber optic link or other shield cable interface. Also, a wireless enhanced services transmission transceivers 102 provide an appropriate interface to a wideband wireless interface 70. Variable bandwidth repeater switch 42 employs these transmission services or other interfaces know by those of skill in the art.

Figure 3:
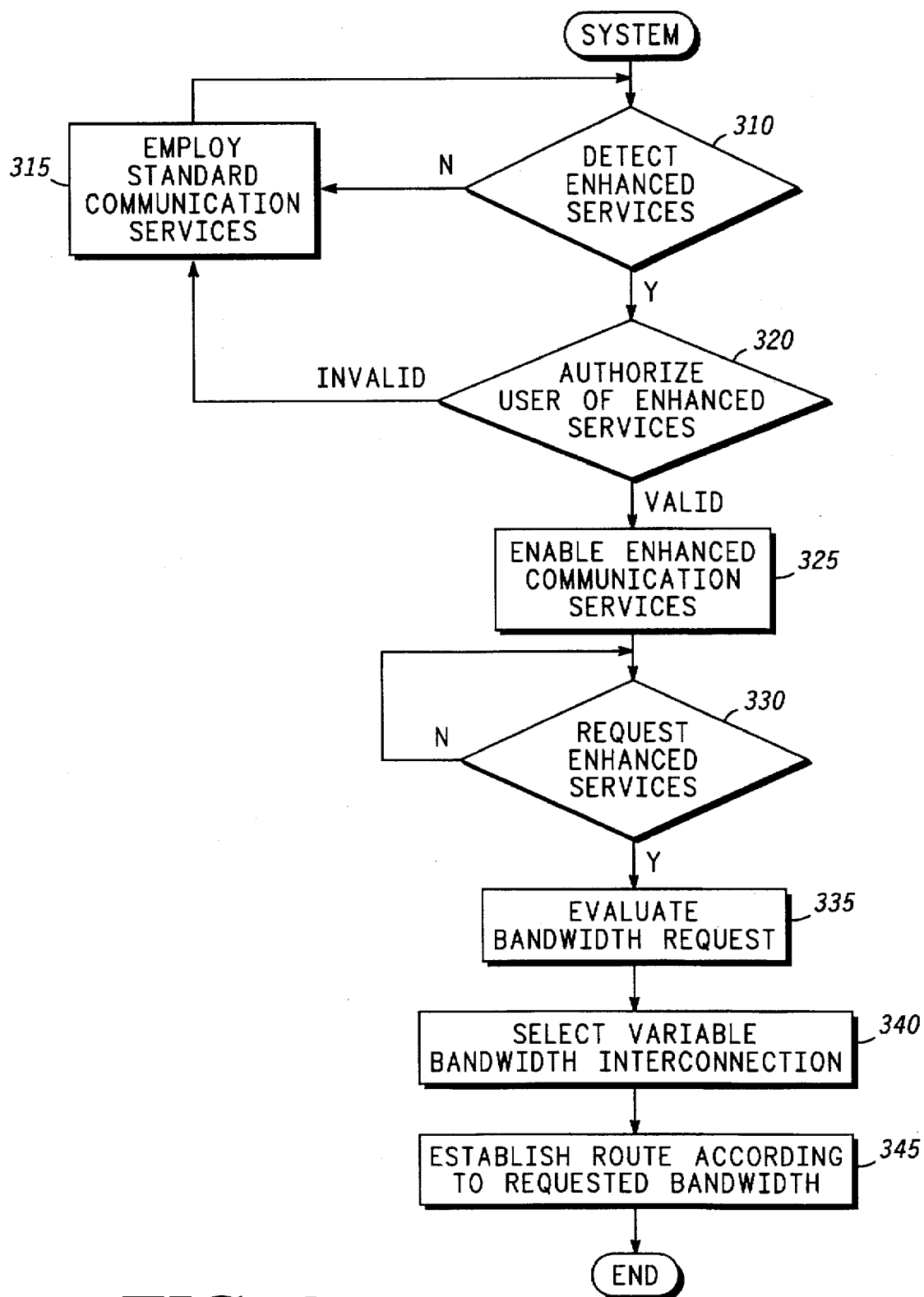
FIG. 3 is a flowchart of a method for dynamically allocating bandwidth to a subscriber unit in an enhanced services region, in accordance with a preferred embodiment of the present invention.

FIG. 3 is a flowchart of a method for dynamically allocating bandwidth through a variable bandwidth repeater switch to a subscriber unit in an enhanced services region, in accordance with a preferred embodiment of the present invention. Enhanced services communication system 10 (FIG. 1) has a standard region and an enhanced services region. In the enhanced services region, bandwidth on communication links is dynamically allocated using variable bandwidth repeater switch 42 (FIG. 1) to subscriber units located within enhanced services region 58 (FIG. 1).

A query task 310 evaluates the availability of enhanced services, such as by monitoring for the transmission of enhanced services beacon signal 52 (FIG. 1) or other communicative protocol such as the exchange of a system capability status with a subscriber unit. By detecting the availability of enhanced services, a subscriber unit may more efficiently and economically operate in enhanced services communication system 10 (FIG. 1). When enhanced services are not available, a task 315 employs standard communication services for transmitting information through the system.

When enhanced services are available, a query task 320 authorizes or validates users of enhanced services. In a preferred embodiment, variable bandwidth repeater switch 42 consults a record to verify that enhanced services are approved for a particular subscriber unit. If enhanced services are not approved, a subscriber unit employs only standard communication services.

When a subscriber unit is authorized, a task 325 enables enhanced communication services to a particular subscriber unit. The subscriber unit may then place bandwidth requests for allocation of an enhanced services communication link having varied parameters, such as a change in bandwidth.

A query task 330 determines when a request for enhanced services has been issued. When a request for enhanced services is detected, a task 335 evaluates the bandwidth request from a subscriber unit by comparing the request with available resources.

A task 340 selects a variable bandwidth connection from a menu of interconnections through variable bandwidth repeater switch 42 (FIG. 1) having at least the requested bandwidth. In a preferred embodiment of the present invention, interconnections are selected by evaluating the cost of each of the interconnections having at least the requested bandwidth. In another preferred embodiment, selection of interconnections is performed according to other criteria such as propagation delays through the network. In yet another preferred embodiment, the plurality of available interconnections are presented to the user of a subscriber unit, wherein the user selects a particular interconnect from among several.

In another preferred embodiment, the selecting step may further allow the user to withdraw the bandwidth request. Such a withdrawal may be occur when interconnection costs become expensive or the benefits of dynamic allocation of bandwidth becomes prohibitive.

A task 345 establishes the route or interconnection according to the requested interconnect. Such interconnection may be performed by switch 104 (FIG. 2) at the direction of switch controller 106 (FIG. 2). Communication over enhanced services communication link 56 (FIG. 1) commences when interconnection completes.

Figure 4:
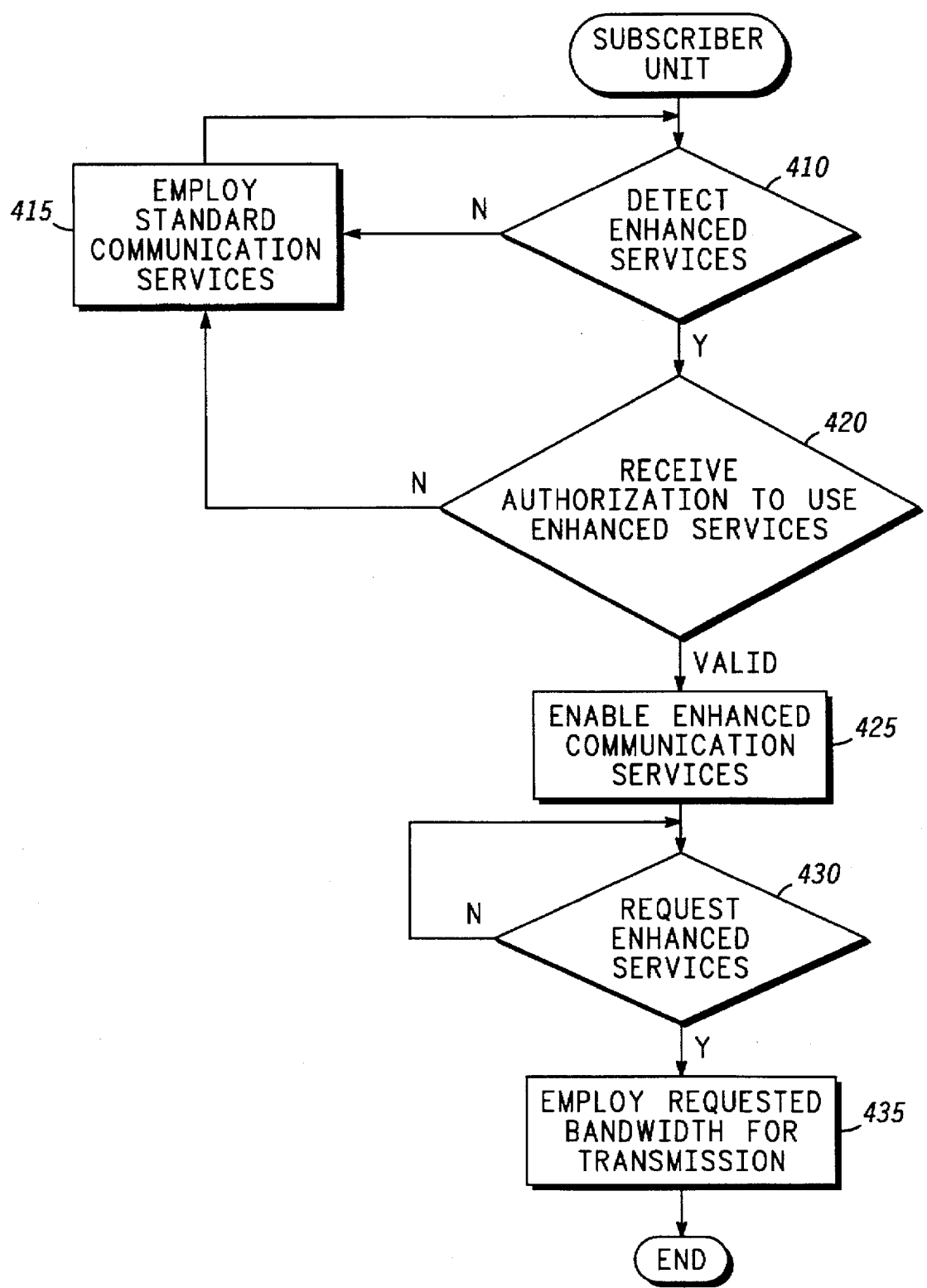
FIG. 4 is a flowchart of a method performed by a subscriber unit that utilizes dynamically allocated bandwidth through a variable bandwidth repeater switch in an enhanced services region of a communication system, in accordance with a preferred embodiment of the present invention.

FIG. 4 is a flowchart of a method for a subscriber unit employing dynamically allocated bandwidth through a variable bandwidth repeater switch in an enhanced services region in a communication system, in accordance with a preferred embodiment of the present invention. A subscriber unit may operate within an enhanced services communication system 10 (FIG. 1) in both a standard region and an enhanced services region. In enhanced services region 58 (FIG. 1), bandwidth on communication links may be dynamically allocated using variable bandwidth repeater switch 42 (FIG. 1).

A subscriber unit, in a query task 410, evaluates the availability of enhanced services, by monitoring for the transmission of enhanced services beacon signal 52 (FIG. 1) or other communicative protocol such as the exchange of a system capability status with a subscriber unit. By detecting the availability of enhanced services, a subscriber unit may more efficiently and economically operate in enhanced services communication system 10 (FIG. 1). When enhanced services are not available, a subscriber unit performs a task 415 employing standard communication services for transmitting information through the system.

A subscriber unit, in a query task 420, receives authorization or validation to employ enhanced services. If enhanced services are not approved, a subscriber unit may employ only standard communication services.

When a subscriber unit receives an authorization to use enhanced services, a task 425 enables enhanced communication services to a particular subscriber unit. The subscriber unit may then place bandwidth requests for allocation of an enhanced services communication link having varied parameters, such as a change in bandwidth.

A query task 430 determines if a request for enhanced services has been issued. When a request for enhanced services is granted, a task 435 employs the requested bandwidth for transmission of data through the variable bandwidth repeater switch. In a preferred embodiment, the subscriber unit transmits consistent with the requested bandwidth through a variable bandwidth connection from among several interconnections through the variable bandwidth repeater switch, and receives consistent with requested bandwidth through the variable bandwidth connection. In another preferred embodiment, a subscriber unit receives a menu of interconnections having at least the requested bandwidth, and selects from among the choices. In yet another preferred embodiment, the menu of available interconnections are presented to the user of a subscriber unit, wherein the user may select a particular interconnect from among those listed in the menu.

In another preferred embodiment, the subscriber unit, in the selecting step, may further allow the user to withdraw the bandwidth request. Such a withdrawal may occur when interconnection costs become expensive or the benefits of dynamic allocation of bandwidth becomes prohibitive.

Following the establishment of a route or interconnection of resources to allocate the requested bandwidth, a task 435 employs the requested bandwidth for transmission of data.

Thus, a method and variable bandwidth repeater switch for dynamically allocating bandwidth through a variable bandwidth repeater switch having a plurality of interconnections between a subscriber unit and a standard region to a subscriber unit in an enhanced services region by detecting the availability of enhanced services in the enhanced services region, evaluating availability of requested bandwidth, and allocating the requested bandwidth to the subscriber unit have been disclosed.

Also, a method for employing dynamically allocated bandwidth through a variable bandwidth repeater switch in an enhanced services region, by detecting the availability of enhanced services, requesting dynamic bandwidth from enhanced services, and employing the requested bandwidth for transmission of data with the variable bandwidth repeater switch has been disclosed.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a communication system having a standard services region and an enhanced services region for providing enhanced services to users, a method for dynamically allocating bandwidth through a variable bandwidth repeater switch to a subscriber unit in said enhanced services region, said variable bandwidth repeater switch having a plurality of interconnections between said subscriber unit and said standard services region, said method comprising the steps of:

detecting availability of said enhanced services;

when said subscriber unit requests said enhanced services, evaluating availability of requested bandwidth; and when said requested bandwidth is available, allocating said requested bandwidth to said subscriber unit in response to request for said enhanced services.

2. A method as recited in claim 1, further comprising the step of prior to said evaluating step, authorizing said subscriber unit to employ said enhanced services of said enhanced services region.

3. A method as recited in claim 1, wherein said allocating step comprises the steps of:

selecting a variable bandwidth connection from said plurality of interconnections through said variable bandwidth repeater switch having at least said requested bandwidth; and establishing said variable bandwidth connection through said variable bandwidth repeater switch.

4. A method as recited in claim 3, wherein said selecting step comprises the steps of:

evaluating a cost of each of said plurality of interconnections having at least said requested bandwidth; and selecting said variable bandwidth connection having a least cost of said plurality of interconnections having at least said requested bandwidth.

5. A method as recited in claim 3, wherein said selecting step comprises the steps of:

presenting to a user of said subscriber unit each of said plurality of interconnections having at least said requested bandwidth; and said user of said subscriber unit selecting said variable bandwidth connection having at least said requested bandwidth.

6. A method as recited in claim 5, wherein said selecting step further comprises the step of allowing said user to withdraw said requested bandwidth.

7. In a subscriber unit for operation in a communication system having a standard services region and an enhanced services region for providing enhanced services to users, a method for utilizing dynamically allocating bandwidth through a variable bandwidth repeater switch to said subscriber unit in said enhanced services region, said variable bandwidth repeater switch having a plurality of interconnections between said subscriber unit and said standard services region, said method comprising the steps of:

detecting availability of said enhanced services;

requesting requested bandwidth from said enhanced services; and when said requested bandwidth is available, employing said requested bandwidth for transmission of data with said variable bandwidth repeater switch.

8. A method as recited in claim 7, further comprising the step of prior to said employing step, receiving an authorization to employ enhanced services of said enhanced services region.

9. A method as recited in claim 7, wherein said employing step comprises the steps of:

transmitting data consistent with said requested bandwidth through a variable bandwidth connection from said plurality of interconnections through said variable bandwidth repeater switch; and receiving data consistent with requested bandwidth through said variable bandwidth connection from said plurality of interconnections.

10. A method as recited in claim 9, said employing step further comprises the steps of:

receiving said plurality of interconnections having at least said requested bandwidth; and a user selecting said variable bandwidth connection having at least said requested bandwidth.

11. A method as recited in claim 10, wherein said selecting step further comprises the step of allowing said user to withdraw said bandwidth request.

12. A communication system having a standard services region and an enhanced services region for dynamically allocating bandwidth in said enhanced services region and for providing enhanced services to a user, said communication system comprising:

a subscriber unit for detecting availability of said enhanced services region; and when said subscriber unit requests said enhanced services in said enhanced services region, a variable bandwidth repeater switch having a plurality of interconnections between said subscriber unit and said standard services region for evaluating availability of requested bandwidth, and when said requested bandwidth is available, allocating said requested bandwidth to said subscriber unit.

13. A communication system as recited in claim 12, wherein said variable bandwidth repeater switch further authorizes said subscriber unit to employ enhanced services in said enhanced services region.

14. A communication system as recited in claim 12, wherein said variable bandwidth repeater switch further selects a variable bandwidth connection from said plurality of interconnections through said variable bandwidth repeater switch having at least said requested bandwidth, and establishes said variable bandwidth connection through said variable bandwidth repeater switch.

15. A communication system as recited in claim 14, wherein said variable bandwidth repeater switch further evaluates a cost of each of said plurality of interconnections having at least said requested bandwidth, and selects said variable bandwidth connection having a least cost of said plurality of interconnections having at least said requested bandwidth.

16. A communication system as recited in claim 14, further comprising:

said variable bandwidth repeater switch further presents to a user of said subscriber unit each of said plurality of interconnections having at least said requested bandwidth; and said subscriber unit further selects said variable bandwidth connection having at least said requested bandwidth.

17. A communication system as recited in claim 15, wherein said variable bandwidth repeater switch allows said user of said subscriber unit to withdraw said requested bandwidth.

18. In a communication system having a standard services region and an enhanced services region, a variable bandwidth repeater switch for dynamically allocating bandwidth available to a subscriber unit operating in said enhanced services region when said subscriber unit requests a requested bandwidth, comprising:

an enhanced services region transceiver for receiving a bandwidth request from a subscriber unit in said communication system and for employing said requested bandwidth by transmitting and receiving consistent with said requested bandwidth with said subscriber unit;

an enhanced services transmission transceiver for establishing an interface with said standard services region for employing said requested bandwidth by transmitting and receiving consistent with said requested bandwidth with said standard services region; and a switch having a plurality of interconnections between said enhanced services region transceiver interfacing with said subscriber unit, and said enhanced services transmission transceiver interfacing with said standard services region, said switch also evaluates availability of requested bandwidth and allocates said requested bandwidth when said requested bandwidth is available.

19. A variable bandwidth repeater switch as recited in claim 18, further comprising:

an enhanced services beacon transmitter for defining said enhanced services region by broadcasting a beacon signal about said enhanced services region.

20. A variable bandwidth repeater switch as recited in claim 18, wherein said switch further comprises:

a switch controller for authorizing said subscriber unit to employ enhanced services of said enhanced services region.

21. A variable bandwidth repeater switch as recited in claim 20, wherein said switch controller further selects a variable bandwidth connection from said plurality of interconnections through said switch, and establishes said variable bandwidth connection through said switch.

* * * * *